United States Patent
Jiang

(10) Patent No.: US 7,630,811 B2
(45) Date of Patent: Dec. 8, 2009

(54) AUTOMATED MANUAL TRANSMISSION LAUNCH CONTROL

(75) Inventor: Hong Jiang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 825 days.

(21) Appl. No.: 11/037,983

(22) Filed: Jan. 18, 2005

(65) Prior Publication Data

US 2006/0161325 A1 Jul. 20, 2006

(51) Int. Cl.
*G06F 19/00* (2006.01)
*H02P 7/00* (2006.01)
*F16H 3/38* (2006.01)
*F16D 21/02* (2006.01)

(52) U.S. Cl. .............. 701/54; 701/51; 701/52; 701/53; 701/55; 477/7; 477/8; 477/15; 477/30; 477/31; 74/339; 74/340; 192/48.8; 192/48.9; 192/48.91

(58) Field of Classification Search ............. 192/52.3; 74/15.63; 701/51, 110
See application file for complete search history.

(56) References Cited

U.S. PATENT DOCUMENTS

| | | | |
|---|---|---|---|
| 1,457,221 A * | 5/1923 | Fishburn ................. 192/52.3 |
| 4,031,762 A * | 6/1977 | Shellberg ................. 74/15.63 |
| 5,413,539 A | 5/1995 | Leonard et al. |
| 5,630,773 A | 5/1997 | Slicker et al. |
| 5,779,594 A * | 7/1998 | Minowa et al. ............. 477/156 |
| 5,823,912 A | 10/1998 | Fischer et al. |
| 5,879,268 A * | 3/1999 | Yasue et al. ................. 477/143 |
| 5,902,212 A * | 5/1999 | Kamada et al. ............. 477/155 |
| 6,073,071 A * | 6/2000 | Yasue et al. ................... 701/51 |
| 6,113,515 A | 9/2000 | Salecker et al. |
| 6,152,275 A | 11/2000 | Fischer et al. |
| 6,220,987 B1 * | 4/2001 | Robichaux et al. ............ 477/97 |
| 6,243,637 B1 * | 6/2001 | Minowa et al. ............... 701/51 |
| 6,279,531 B1 * | 8/2001 | Robichaux et al. ..... 123/339.19 |
| 6,299,565 B1 | 10/2001 | Jain et al. |
| 6,334,833 B1 * | 1/2002 | Ochi et al. ................... 477/143 |
| 6,401,026 B2 * | 6/2002 | Robichaux et al. .......... 701/110 |
| 6,415,213 B1 * | 7/2002 | Hubbard et al. ................ 701/51 |
| 6,425,373 B1 * | 7/2002 | Robichaux et al. .......... 123/436 |

(Continued)

FOREIGN PATENT DOCUMENTS

| | | |
|---|---|---|
| EP | 1357309 | 10/2003 |
| EP | 1382479 | 1/2004 |
| GB | 2343490 | 5/2000 |
| WO | WO 2004/005522 * | 1/2004 |

OTHER PUBLICATIONS

NPL- Clutch funtionality and Purpose.*

*Primary Examiner*—Dalena Tran
*Assistant Examiner*—Ian Jen
(74) *Attorney, Agent, or Firm*—David Kelley; MacMillan, Sobanski & Todd LLC

(57) ABSTRACT

The present invention relates to launch control of a vehicle having an automated manual transmission and an automated clutch selectively engaging an output of an engine to an input of the transmission. When a request for vehicle launch is detected, an output speed of the automated clutch and a desired clutch output torque are obtained. The automated clutch is partially engaged to allow for slip between an input to the clutch and an output from the clutch, and a desired amount of the slip between the input to the clutch and the output from the clutch is determined. A desired engine speed is calculated based on the desired amount of slip, with the engine torque automatically adjusted to obtain the desired engine speed.

20 Claims, 4 Drawing Sheets

U.S. PATENT DOCUMENTS

| | | | |
|---|---|---|---|
| 6,434,466 B1 * | 8/2002 | Robichaux et al. | 701/54 |
| 6,463,821 B1 * | 10/2002 | Reed et al. | 74/330 |
| 6,468,182 B1 | 10/2002 | Brandt et al. | |
| 6,482,123 B2 | 11/2002 | Steeby | |
| 6,511,399 B2 * | 1/2003 | Mc Collum Etchason et al. | 477/107 |
| 6,561,948 B2 | 5/2003 | Markyvech et al. | |
| 6,564,663 B2 * | 5/2003 | Rioux et al. | 74/336 R |
| 6,616,560 B2 * | 9/2003 | Hayabuchi et al. | 475/116 |
| 6,713,978 B2 * | 3/2004 | Parlos et al. | 318/268 |
| 6,754,574 B2 * | 6/2004 | Tokura et al. | 701/67 |
| 6,790,159 B1 * | 9/2004 | Buchanan et al. | 477/86 |
| 6,819,997 B2 * | 11/2004 | Buchanan et al. | 701/67 |
| 6,826,974 B2 * | 12/2004 | Kobayashi | 74/339 |
| 6,883,394 B2 * | 4/2005 | Koenig et al. | 74/335 |
| 6,961,646 B2 * | 11/2005 | Soliman et al. | 701/51 |
| 7,107,135 B2 * | 9/2006 | Soliman et al. | 701/55 |
| 7,219,000 B2 * | 5/2007 | Steinmetz et al. | 701/51 |
| 2003/0043032 A1 | 3/2003 | Jung | |
| 2004/0033861 A1 | 2/2004 | Wheeler et al. | |
| 2004/0060378 A1 | 4/2004 | Yamamoto et al. | |
| 2007/0252689 A1 * | 11/2007 | Rothschild | 340/539.13 |

* cited by examiner

AUTOMATED MANUAL TRANSMISSION LAUNCH CONTROL

BACKGROUND OF INVENTION

The present invention relates to launch control of a vehicle having an automated manual transmission.

Clutches connected between the engine output and the transmission input are conventionally employed with vehicles having manual transmissions. The engagement of these clutches are controlled by a vehicle operator pressing on or releasing a clutch pedal. While these conventional manual transmissions have some drawbacks relative to conventional automatic transmissions—the need for the vehicle operator to actuate the clutch pedal and manually shift gears—they are still employed due to some inherent advantages. Namely, a conventional clutch and manual transmission is typically less expensive than a conventional automatic transmission and torque converter, and the conventional manual transmission arrangement does not have the energy losses associated with the torque converter.

Consequently, attempts have been made to develop a one or two clutch and manual type of transmission arrangement that will operate like an automatic transmission—an automated manual transmission or a powershift transmission. That is, employ a vehicle controlled clutch and gear shifting system, but without a torque converter or the more complex planetary gear sets and shift mechanisms of a conventional automatic transmission. One significant concern with these new systems, however, is the potential for heat build-up in the clutch during a vehicle launch (i.e., the transmission is in gear and the vehicle accelerates from a standstill). In order for a smooth launch of the vehicle from standing, there will initially be some slippage somewhere along the drive line. In the conventional automatic transmission arrangement, the torque converter allows for this slippage by shearing the fluid therein, with the torque converter readily having the thermal capacity to absorb and dissipate the excess heat generated. But for an automated type transmission with a clutch instead of a torque converter, the clutch will create the slippage, which creates heat build-up in the clutch. This heat build-up can occur relatively quickly, and can approach temperatures that may cause significantly increased wear and possibly damage the clutch.

Thus, it is desirable to have an automated manual transmission with a desirable launch function that prevents overheating of a clutch.

SUMMARY OF INVENTION

An embodiment of the present invention contemplates a method of launch control for a vehicle with an engine, an automated manual transmission, and an automated clutch selectively engaging an output of the engine to an input of the transmission, the method comprising the steps of: detecting a request for vehicle launch; obtaining an output speed of the automated clutch; determining a desired clutch output torque; partially engaging the automated clutch to allow for slip between an input to the clutch and an output from the clutch; determining a desired amount of the slip between the input to the clutch and the output from the clutch; calculating a desired engine speed; and automatically adjusting an engine torque to obtain the desired engine speed.

An embodiment of the present invention also contemplates a method of launch control for a vehicle with an engine, an automated manual transmission, and an automated clutch selectively engaging an output of the engine to an input of the automated manual transmission, the method comprising the steps of: detecting a request for vehicle launch; operating in an engine speed control mode by automatically adjusting an engine torque to obtain a desired engine speed, with the desired engine speed being based on a desired amount of slip in the clutch; and operating in a soft lock control mode and ceasing operation in the engine speed control mode, when the amount of the slip in the automated clutch is below a slip threshold, by automatically adjusting the clutch to obtain the desired amount of slip in the clutch.

An embodiment of the present invention also contemplates a vehicle including an engine having an electronic throttle control and an output, an automated manual transmission having an input, and an automated clutch operable to selectively engage the output of the engine with the input to the automated manual transmission. This embodiment of the present invention also contemplates that the vehicle includes at least one controller operable to detect a request for vehicle launch, obtain an output speed of the automated clutch, determine a desired clutch output torque, partially engage the automated clutch to allow for slip between an input to the clutch and an output from the clutch, determine a desired amount of the slip between the input to the clutch and the output from the clutch, calculate a desired engine speed based on the desired amount of slip, and automatically adjust an engine torque to obtain the desired engine speed.

An advantage of an embodiment of the present invention is that a powertrain with an automated manual transmission may provide a smooth vehicle launch while avoiding potential excessive wear or damage to the clutch. The vehicle operator can experience a smooth vehicle launch while providing the desired vehicle acceleration.

Another advantage of an embodiment of the present invention is that the method can be performed without requiring the addition of transmission hardware to accomplish the desired launch function.

DETAILED DESCRIPTION

Figure 1:
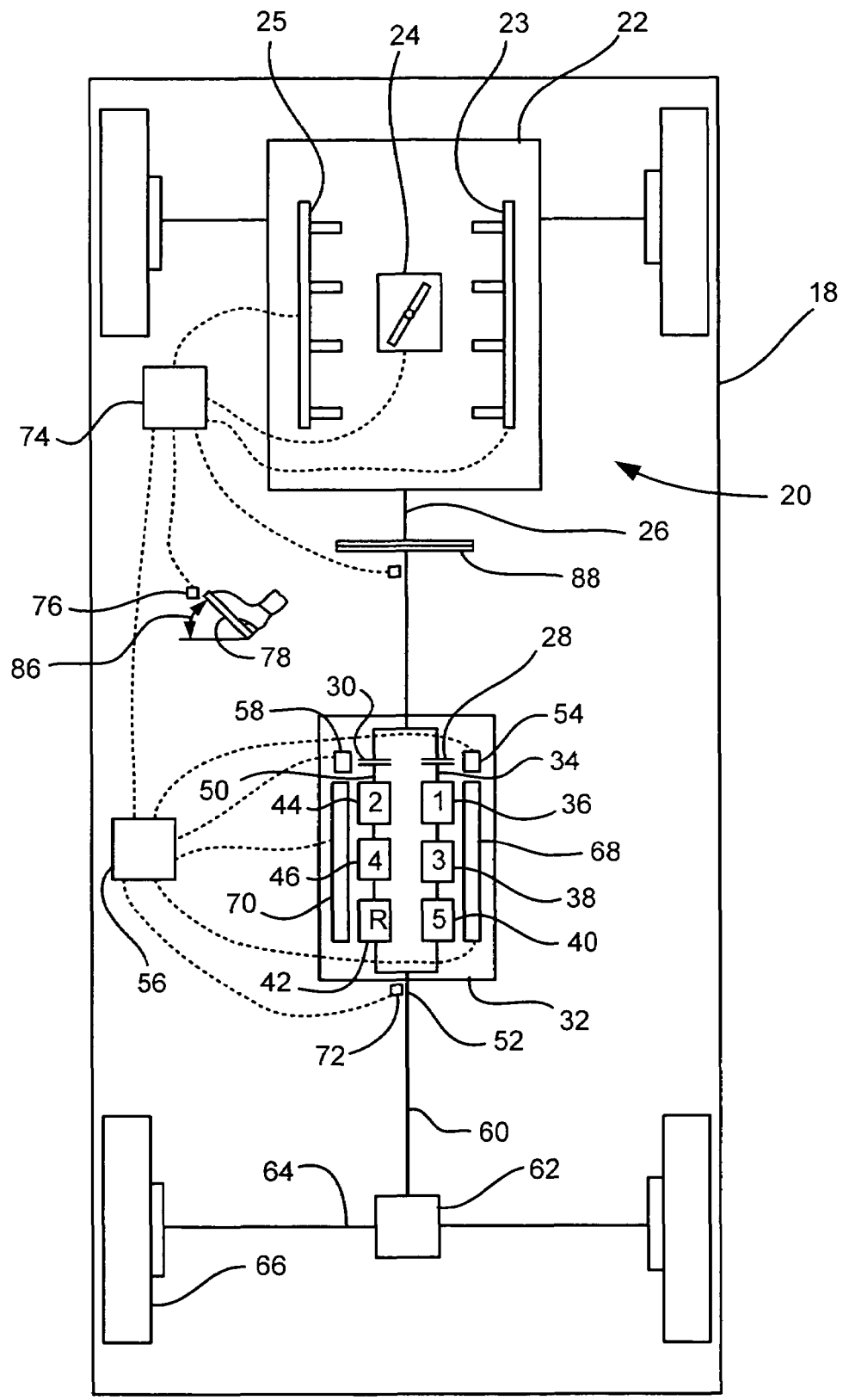
FIG. 1 is a schematic diagram of a vehicle in accordance with an embodiment of the present invention.

FIG. 1 illustrates a vehicle 18, having a vehicle powertrain 20 that includes an engine 22, with an electronically controlled ignition system 23, an electronically controlled throttle 24, an electronically controlled fuel injector system 25, and an engine output shaft 26. The output shaft 26 splits in two and is coupled to a first clutch 28 and a second clutch 30. The first and second clutches 28, 30 are preferably dry clutches but may also be wet clutches instead, and may be located within a transmission 32 or adjacent to the transmission 32. The transmission includes a transmission output shaft 52 that connects to the rest of the powertrain 20, which may include a drive shaft 60, differential 62, axle 64, and wheels/tires 66. While the configuration appears generally as a rear wheel drive arrangement, the present invention is equally applicable to a front wheel drive arrangement as well.

The transmission 32 is preferably a type that has gear sets similar to those of a conventional manual transmission rather than gear sets similar to those of a conventional automatic transmission. The transmission 32 is also preferably configured as a powershift transmission in which the odd numbered gear ratios—a first gear 36, a third gear 38, and a fifth gear 40—are driven via an output 34 from the first clutch 28; and the even numbered gear ratios—a second gear 44, a fourth gear 46, and possibly a reverse gear 42—are driven via an output 50 from the second clutch 30. When the transmission 32 is operating in one of the odd gears, the first clutch 28 is engaged and the second clutch 30 is disengaged, which allows for even numbered gear shifting. Then, the first clutch 28 is disengaged while the second clutch 30 is engaged so the transmission 32 is now operating in one of the even numbered gears. Accordingly, this arrangement allows for torque delivery through the transmission 32 to the transmission output shaft 52 even during shifting. While the powertrain 20 employs a powershift transmission 32, the present invention may also be applied to automated manual transmissions where clutch heating or rough acceleration during a launch situation may present a concern. Accordingly, when the term automated manual transmission is used herein, it includes both automated manual transmissions employing a single clutch as well as powershift transmissions, even though they employ two clutches.

Through electronically controlled actuators, the engagement and disengagement of the first and second clutches 28, 30, as well as shifting of the gears, is preferably automated. A first clutch actuator 54 regulates the first clutch 28 and is electronically controlled by a transmission control unit 56, and a second clutch actuator 58 regulates the second clutch 30 and is also electronically controlled by the transmission control unit 56. The dashed lines in FIG. 1 indicate electric or other types of communication/control connections between vehicle components. A first gearset actuator 68 manipulates the odd gears 36, 38, 40, and a second gearset actuator 70 manipulates the even and reverse gears 42, 44, 46, with both being controlled by the transmission control unit 56. The transmission control unit 56 also connects to a sensor 72 for detecting the speed at the output of the transmission 32. The sensor 72 can be employed for determining the speed of the vehicle, or, if so desired, a sensor at a different location may be employed for determining the speed of the vehicle 18. The transmission control unit 56 is also in communication with an engine control unit 74. Alternatively, the transmission control unit 56 may be integral with the engine control unit 74.

The engine control unit 74 is also in communication with and controls the ignition system 23, electronic throttle control 24, and fuel injection system 25, as well as a sensor 76 for detecting the position or angle 86 of the accelerator pedal 78. An engine output sensor 80 can detect the speed of the engine output shaft 26 and is also in communication with the engine control unit 74. The engine control unit 74, as well as other sensors and subsystems to which they connect, will not be described in any detail herein since the design and functioning thereof are known to those skilled in the art.

Optionally, there may be a dual mass flywheel 88 connected between the engine output shaft 26 and the input to the clutches 28, 30. The dual mass flywheel 88 helps damp out oscillations, and so may be employed to shorten or eliminate a soft lock phase of operation, as discussed below.

Figure 2A:
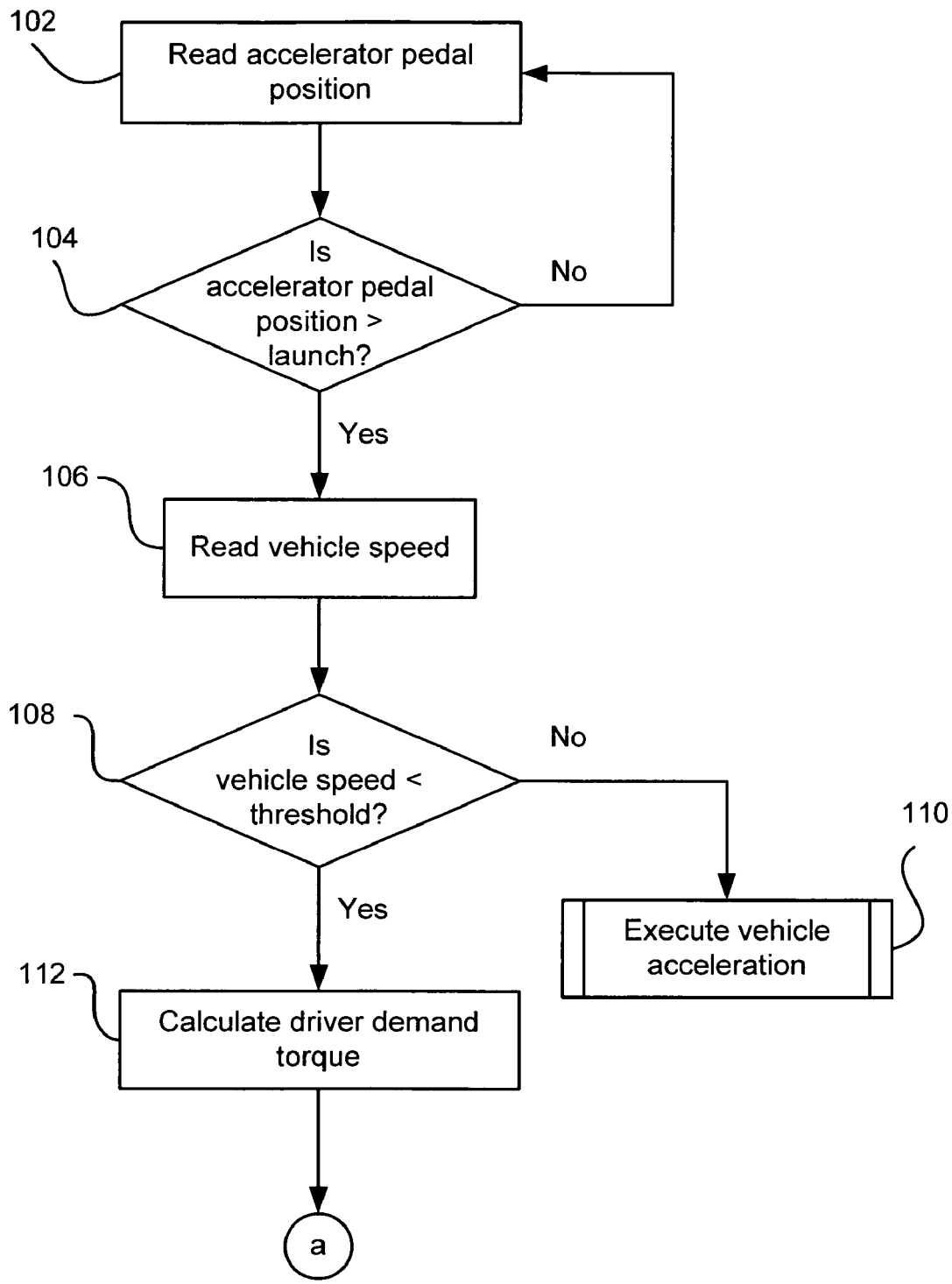
FIGS. 2A and 2B are a flow chart disclosing a method of accomplishing a vehicle launch in accordance with an embodiment of the present invention.
Figure 2B:
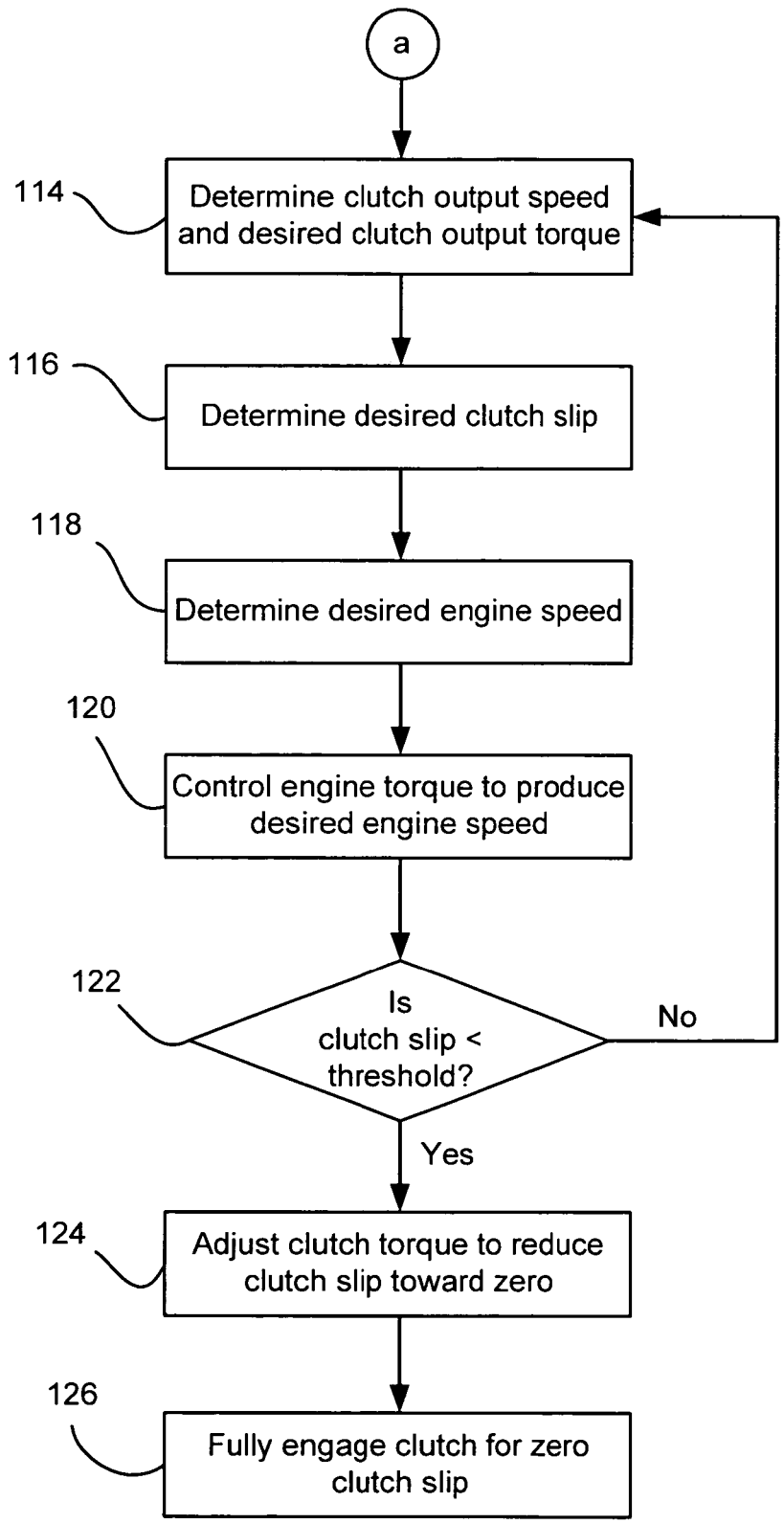

FIGS. 2A and 2B is a flow chart illustrating a method of launch control for a vehicle with an automated manual transmission, and may be applied to the vehicle powertrain 20 shown in FIG. 1. This is an automatic control strategy for use with a multiple gear ratio transmission in a vehicle driveline in which the crankshaft (engine output) is connected to a dry (or wet) clutch, which, in turn, is connected to multiple ratio gearing, without a hydrokinetic torque converter. The strategy is adapted especially for use with a dry clutch, which provides the driving engagement during vehicle launch. The strategy makes it possible to control the engine and clutch to achieve a smooth vehicle launch. The launch situation is one where the vehicle transmission is in gear, the vehicle is essentially at a standstill or only creeping, and the vehicle operator presses on the accelerator pedal sufficiently to indicate a desire to cause the vehicle to accelerate. As mentioned above, it is important to properly control this situation since clutch slippage is desired for a smooth launch but too much clutch slippage can cause the temperature of the clutch to rise rapidly.

The accelerator pedal position/angle is detected, block 102, and a determination is made as to whether the accelerator position/angle is greater than a predetermined launch threshold, block 104. If not, this is not a vehicle launch situation. If it is, then the speed of the vehicle is detected, block 106, and compared to a speed threshold value, block 108. If the vehicle speed is not below the speed threshold, then this is not a vehicle launch situation and a vehicle acceleration routine is executed, block 110. The vehicle acceleration routine employed when the vehicle is already moving at a substantial speed does not form a part of this invention and so will not be discussed further herein. If the vehicle speed is less than the speed threshold, then the vehicle is in a vehicle launch situation.

A driver demand torque is calculated, block 112. The driver demand torque is a function of the current accelerator pedal position and vehicle speed, and is a common determination employed with engine controllers, so it will not be discussed further herein. Typically, the driver demand torque is taken from a look-up table. The clutch output speed and desired clutch output torque are determined, block 114. The amount of clutch output torque is determined based on the gear ratio of the transmission and the driver demand torque. The clutch output speed may be calculated by sensing the transmission output speed and factoring in the current transmission gear ratio, or, alternatively, a sensor may be located at the output of the clutch to directly measure this speed. The desired clutch slip is determined, block 116, which is a function of the pedal position and vehicle speed. The amount of slip can be an empirical value taken from a look-up table and is an amount that is high enough to allow for smooth acceleration while minimizing the amount of slip in order to minimize the heat build-up in the clutch. This slip is determined as a difference in revolutions-per-minute (RPMs) between the clutch input and the clutch output. The desired engine speed (in RPMs) is determined, block 118. This engine speed is the desired clutch slip plus the clutch output speed.

The engine torque is then controlled to produce the desired engine speed, block 120. The engine torque control is accomplished in a known fashion by the engine control unit and can employ, for example, electronic throttle control, spark timing and/or fuel system control. This is an engine speed control phase, as is discussed below relative to FIGS. 3A and 3B. An advantage to using engine torque control during this initial portion of the vehicle launch is that the vehicle occupants generally will not feel the oscillations in engine speed that occur. On the other hand, if the adjustments during this initial portion of the vehicle launch were made by manipulating the clutch in order to adjust the clutch torque, it is possible that the vehicle occupants would feel a shudder from the clutch torque oscillations. Beyond a certain point in the vehicle launch, then clutch torque adjustments generally can be made without the vehicle occupants feeling any oscillations.

A determination is made whether the clutch slip is below a slip threshold, block 122. If the clutch slip is not below the slip threshold, then the routine returns to block 114 and the engine controlled clutch slip is continued. At a certain point during the vehicle launch, the amount of clutch slip is relatively small and the clutch output speed and torque are high enough that smooth acceleration can be maintained by manipulating the clutch. The amount of slip that allows for the smooth acceleration can be empirically determined and taken from a look-up table. At this point, it is advantageous to manipulate the clutch torque to control the slip rather than manipulating the engine torque to control the slip through engine speed. Thus, when the clutch slip is below the slip threshold, the clutch is controlled by the transmission control unit to reduce the clutch slip toward zero by adjusting the clutch torque, block 124. The rate at which the clutch slip is adjusted can be taken from a look-up table and may be a function of accelerator pedal position and engine speed. This is a soft lock phase, as will be discussed below relative to FIGS. 3A and 3B. When the speed and load conditions dictate, the transmission control unit will manipulate the clutch to initiate a hard lock phase, where the target clutch slip value becomes zero, block 126. During the soft and hard lock phases, the engine torque is no longer controlled with the purpose of maintaining a desired slip.

The soft lock phase, block 124, may be advantageously skipped if the vehicle powertrain includes a dual mass flywheel. Since the dual mass flywheel helps damp out oscillations, the clutch can be manipulated to increase the torque (and reduce the slip) more quickly to a zero clutch slip condition without the vehicle occupants feeling this change.

This process sets the vehicle in motion in a smooth, controlled manner, either from a standstill or while the vehicle is in the process of creeping at a very low speed. The vehicle operator merely actuates the accelerator pedal, with the system regulating the automated clutch, automated manual transmission, and the engine to produce the desired launch of the vehicle. What this process accomplishes is that, at the beginning of the launch process, the torque entering the clutch is reduced by lowering the engine torque to a level slightly above the clutch output torque, thus reducing the amount of slipping on the clutch, while engagement of the clutch, and thus the amount of clutch torque, is increased gradually, which then allows for a corresponding increase in the engine torque. Early in the vehicle launch process, more engine torque would just result in higher engine speed, and thus higher clutch slip, without noticeably improving the transmission output torque. Accordingly, all of this is accomplished while minimizing the slip on the clutch in order to minimize the heat build-up.

Figure 3A:
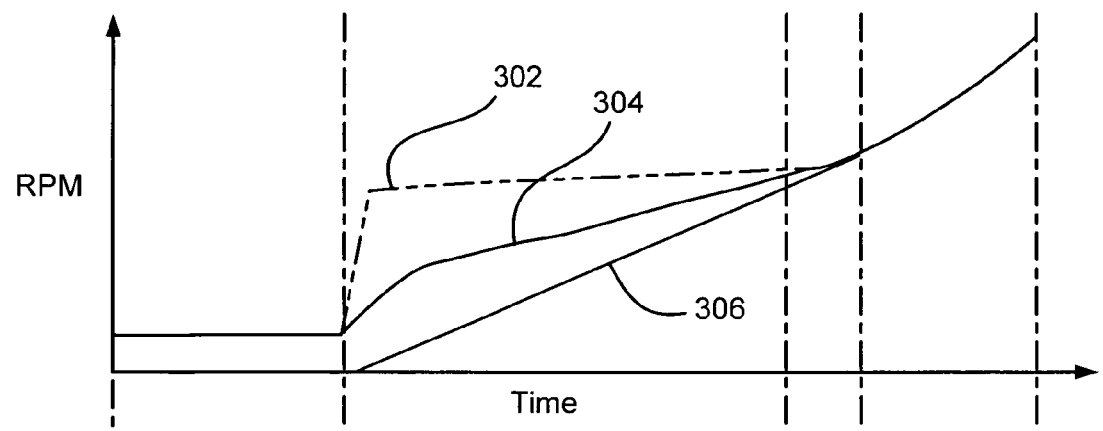
FIGS. 3A and 3B are graphs relating to the launch strategy of the present invention
Figure 3B:
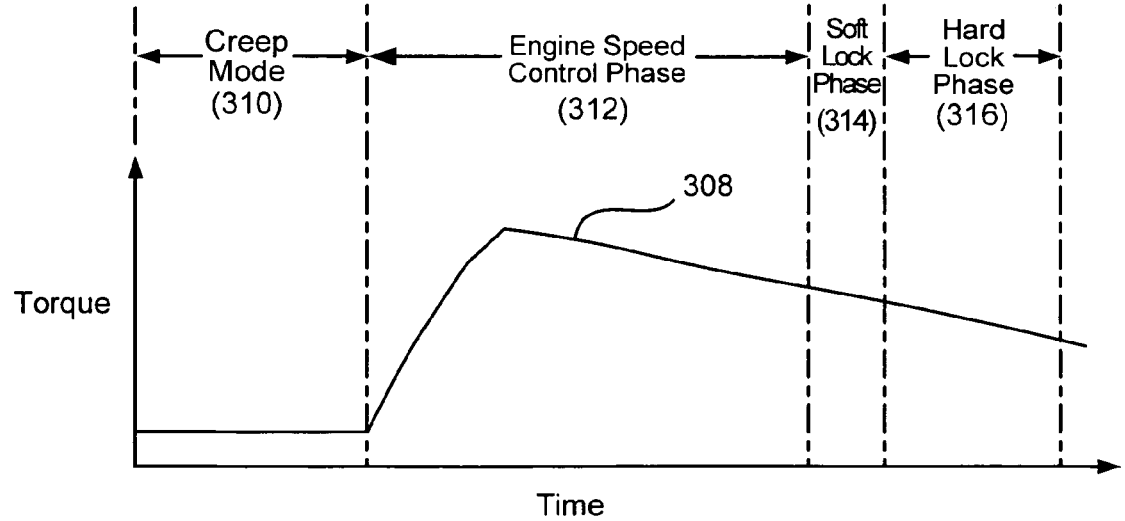

FIGS. 3A and 3B show example graphs of rotational speed (RPM) versus time and torque versus time, respectively. In the initial time period, a creep mode 310, the vehicle is standing still or only moving very slowly. This mode ends when the vehicle operator actuates the accelerator pedal to indicate a demand for a vehicle launch. In a prior art system, the engine speed 302 increases based on the pedal position and vehicle speed, without regard to the clutch output speed 306. At this point in the launch, the engine speed and torque are decoupled from the clutch output speed and torque, respectively, so, due to inertia, the rise of the engine speed will be much quicker than the clutch output speed. Consequently, this prior art method creates a large difference between the engine speed 302 and the clutch output speed 306 during the initial portion of the vehicle launch.

For the system and method of the present invention, the initial demand for vehicle launch is accomplished via an engine speed control phase 312. The engine torque is manipulated to obtain a desired engine speed 304 that is greater than the clutch output speed 306 by only the amount of desired clutch slip. During this phase, the adjustments to the engine to maintain the desired engine speed, and hence the desired slip, are not generally felt by the vehicle occupants, giving a feeling of a smooth vehicle launch. Moreover, the amount of clutch slip is clearly less than in the prior art situation, thus reducing the heat build-up in the clutch. As the engine speed control phase 312 progresses, the amount of clutch slip decreases because the clutch output speed increases faster than the engine speed is increased. When the clutch slip reaches the desired threshold, the soft lock phase 314 is initiated. In this phase, the clutch torque is used to control the slip as the slip is reduced toward zero. The hard lock phase 316 begins when the clutch slip is at or close to zero and remains essentially zero. The clutch output torque 308 during these vehicle launch phases is illustrated in FIG. 3B.

While certain embodiments of the present invention have been described in detail, those familiar with the art to which this invention relates will recognize various alternative designs and embodiments for practicing the invention as defined by the following claims.

What is claimed is:

1. A method of launch control for a vehicle with an engine, an automated manual transmission, and an automated clutch selectively engaging an output of the engine to an input of the transmission, the method comprising the steps of:
   (a) detecting a request for vehicle launch;
   (b) obtaining an output speed of the automated clutch;
   (c) determining a desired clutch output torque;
   (d) partially engaging the automated clutch to allow for slip between an input to the clutch and an output from the clutch;
   (e) determining a desired amount of the slip between the input to the clutch and the output from the clutch;
   (f) calculating a desired engine speed based on the desired amount of slip; and
   (g) automatically adjusting an engine torque to obtain the desired engine speed.

2. The method of claim 1 wherein step (f) is further defined by adding the desired amount of slip to the output speed of the automated clutch.

3. The method of claim 2 wherein the desired amount of slip is determined as a function of an accelerator pedal position and a speed of the vehicle.

4. The method of claim 2 further including the steps of: (h) reducing the desired amount of slip, (i) recalculating the desired engine speed, and (j) readjusting the engine torque to obtain the recalculated desired engine speed.

5. The method of claim 1 wherein step (a) is further defined by detecting a position of an accelerator pedal that is greater than a predetermined launch threshold, and detecting a vehicle speed that is less than a speed threshold.

6. The method of claim 1 wherein step (c) is further defined by the desired clutch output torque being a function of a gear ratio of the transmission and a driver demand torque.

7. The method of claim 6 wherein the driver demand torque is determined as a function of an accelerator pedal position and a speed of the vehicle.

8. The method of claim 1 further including the steps of: (h) detecting when the slip is below a slip threshold, (i) ceasing steps (f) and (g), and (j) automatically adjusting clutch torque to obtain a desired amount of slip.

9. The method of claim 8 further including the step of: (k) fully engaging the automated clutch to reduce the slip to zero.

10. A method of launch control for a vehicle with an engine, an automated manual transmission, and an automated clutch selectively engaging an output of the engine to an input of the automated manual transmission, the method comprising the steps of:

(a) detecting a request for vehicle launch;

(b) operating in an engine speed control mode by automatically adjusting an engine torque to obtain a desired engine speed, with the desired engine speed being based on a desired amount of slip in the clutch; and (c) operating in a soft lock control mode and ceasing step (b), when the amount of the slip in the automated clutch is below a slip threshold, by automatically adjusting the clutch to obtain the desired amount of slip in the clutch.

11. The method of claim 10 further including the step of:
(d) fully engaging the automated clutch to thereby reduce the slip to zero when the amount of the slip in the automated clutch is below a second slip threshold, with the second slip threshold being less than the slip threshold.

12. The method of claim 10 wherein step (a) is further defined by detecting a position of an accelerator pedal that is greater than a predetermined launch threshold, and detecting a vehicle speed that is less than a speed threshold.

13. The method of claim 10 wherein step (b) is further defined by the obtaining an output speed of the automated clutch, and with the desired engine speed being equal to a sum of the desired amount of slip in the clutch and the output speed of the automated clutch.

14. The method of claim 13 wherein the desired amount of slip in the clutch determined as a function of an accelerator pedal position and a speed of the vehicle.

15. The method of claim 10 wherein the desired amount of slip in the clutch determined as a function of an accelerator pedal position and a speed of the vehicle.

16. The method of claim 10 wherein step (b) is further defined by: reducing the desired amount of slip, determining a new desired engine speed based on the reduced desired amount of slip, and readjusting the engine torque to obtain the new desired engine speed.

17. The method of claim 10 wherein the desired amount of slip in the clutch is a function of a desired clutch output torque, and the desired clutch output torque is a function of a gear ratio of the automated manual transmission and a driver demand torque.

18. A vehicle comprising:
an engine having an electronic throttle control and an output;
an automated manual transmission having an input;
an automated clutch operable to selectively engage the output of the engine with the input to the automated manual transmission; and
at least one controller operable to detect a request for vehicle launch, obtain an output speed of the automated clutch, determine a desired clutch output torque, partially engage the automated clutch to allow for slip between an input to the clutch and an output from the clutch, determine a desired amount of the slip between the input to the clutch and the output from the clutch, calculate a desired engine speed based on the desired amount of slip, and automatically adjust an engine torque to obtain the desired engine speed.

19. The vehicle of claim 18 wherein the automated manual transmission is a powershift transmission.

20. The vehicle of claim 18 wherein the automated clutch is a dry clutch.

* * * * *